United States Patent [19]

Parker et al.

[11] 3,994,512
[45] Nov. 30, 1976

[54] UNDERCARRIAGE FOR GRAIN BUGGY OR FARM WAGON

[75] Inventors: Shirley L. Parker, Warsaw; John D. Rohrer, North Manchester, both of Ind.

[73] Assignee: Parker Industries, Inc., Silver Lake, Ind.

[22] Filed: Jan. 6, 1975

[21] Appl. No.: 539,002

[52] U.S. Cl. .............................. 280/687; 280/716; 267/63 A
[51] Int. Cl.² .......................................... B60G 5/00
[58] Field of Search ..... 280/124 R, 124 B, 104.5 R, 280/106.5 R, 684, 687, 716, 717, 721; 267/63 R, 63 A, 153

[56] References Cited
UNITED STATES PATENTS

| | | |
|---|---|---|
| 2,758,832 | 8/1956 | Hickman .......................... 267/63 A |
| 2,782,026 | 2/1957 | Hirst ................................ 267/63 A |
| 3,017,195 | 1/1962 | Hickman .......................... 267/63 A |
| 3,073,620 | 1/1963 | Beck ................................ 267/63 A |
| 3,301,573 | 1/1967 | Hickman ...................... 280/104.5 R |
| 3,544,129 | 12/1970 | Henry-Biabaud ............... 280/106.5 |
| 3,554,576 | 1/1971 | Parker ............................. 267/63 A |
| 3,580,593 | 5/1971 | Sprunger ......................... 267/63 R |
| 3,608,926 | 9/1971 | Sprunger ......................... 267/63 R |
| 3,770,291 | 11/1973 | Kramer ........................... 280/124 B |

*Primary Examiner*—M. H. Wood, Jr.
*Assistant Examiner*—John A. Carroll
*Attorney, Agent, or Firm*—Marmaduke Hobbs

[57] ABSTRACT

An undercarriage for farm wagons and similar vehicles in which the frame of the vehicle is mounted on one or more axles by units at each end of the axles, each unit consisting of plates connected to the axle, a plate connected to the frame and a member of elastomeric material bonded to the facing surfaces of the axle and frame plates to form the primary support at each end of the axle for the frame. The elastomeric material may be rubber and is preferably of a parallelogram shape in vertical cross sectional direction with the low vertical side being connected to the axle plate and the high vertical side being connected to the frame plate. Second axle and frame plates may be employed to which the first axle and frame plates are rigidly secured by bolts or other securing means. The units supporting the frame on the axle are preferably used in pairs in conjunction with tandem axles and, if brakes are used on one or both of the axles, a torsional bar means, including a resilient member, interconnects the two axles.

7 Claims, 7 Drawing Figures

UNDERCARRIAGE FOR GRAIN BUGGY OR FARM WAGON

In the conventional tandem axle farm wagons, the axles on which the wheels are mounted are connected to one another by laterally spaced members along each side near the wheels and these members are pivotally connected at a point between the wheels to the vehicle frame. The pivoted members, which are of the walking beam type, permit the two forward and the two rear wheels to rise and lower together as the vehicle traverses uneven ground, thereby permitting the weight of the wagon to be carried by both axles, rather than merely the forward or the rear axles on the uneven ground. This walking beam type of undercarriage is an expensive installation, often out of proportion in cost to the total cost of the vehicle. Further, the foregoing conventional undercarriage of the walking beam type permits the forward wheels to dig or sink into soft ground, thus making towing difficult and does not permit the individual axles to adjust angularly to one another when the terrain is not the same on both sides of the vehicle; hence, one or two wheels of the tandem undercarriage may rise from the ground. It is therefore one of the principal objects of the present invention to provide a tandem axle undercarriage for a farm wagon, in which the axles are individually mounted or connected to the vehicle frame so that each end of each axle can follow the terrain and the two axles can move vertically without interference from the other axle, while the vehicle is traversing uneven ground.

Another object of the invention is to provide a tandem axle undercarriage for a farm wagon or the like, which is simple in construction and economical and efficient in operation and which is relatively inexpensive to fabricate and install when compared with the conventional tandem axle undercarriage for similar vehicles.

Another object of the invention is to provide a tandem axle undercarriage of the aforementioned type which provides cushioning of the vehicle frame, bed and load when the vehicle is traversing rough roads or ground, and which gives good stability to the vehicle and provides a steering action which assists the vehicle in following the tractor.

Still another object is to provide a tandem undercarriage for farm wagons and similar farm vehicles, which can be easily serviced and worn parts readily replaced without the use of any special equipment or tools, and which will give a long, trouble free performance and, except for the wheels, will give the good service with no lubrication.

Additional objects and advantages of the invention will become apparent from the following description and accompanying drawings, wherein.

Figure 1:
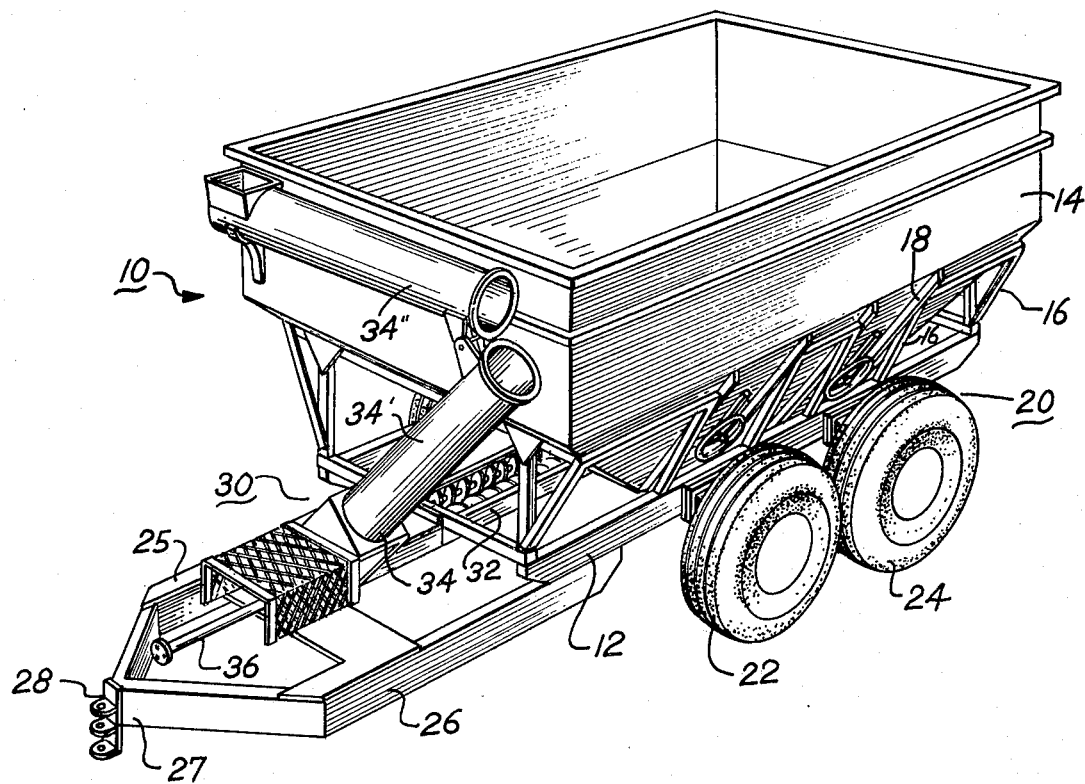
FIG. 1 is a perspective view of a farm wagon in which an undercarriage having the present invention embodied therein is used.
Figure 2:
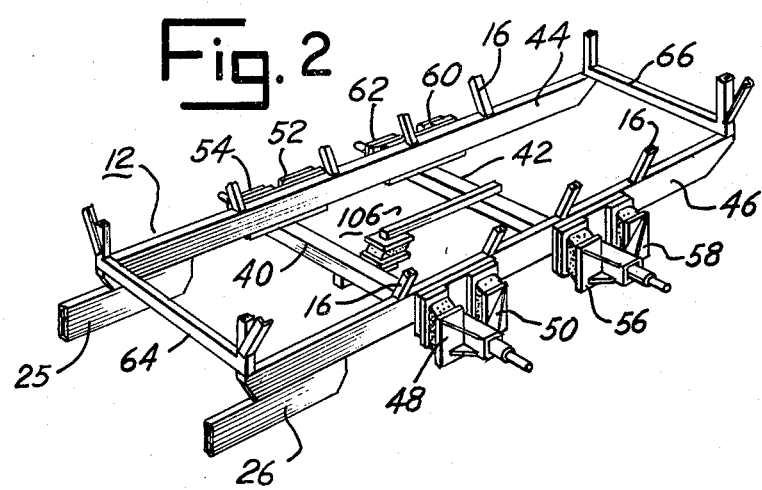
FIG. 2 is a perspective view of the main frame of the farm wagon and the undercarriage with the wheels removed.
Figure 3:
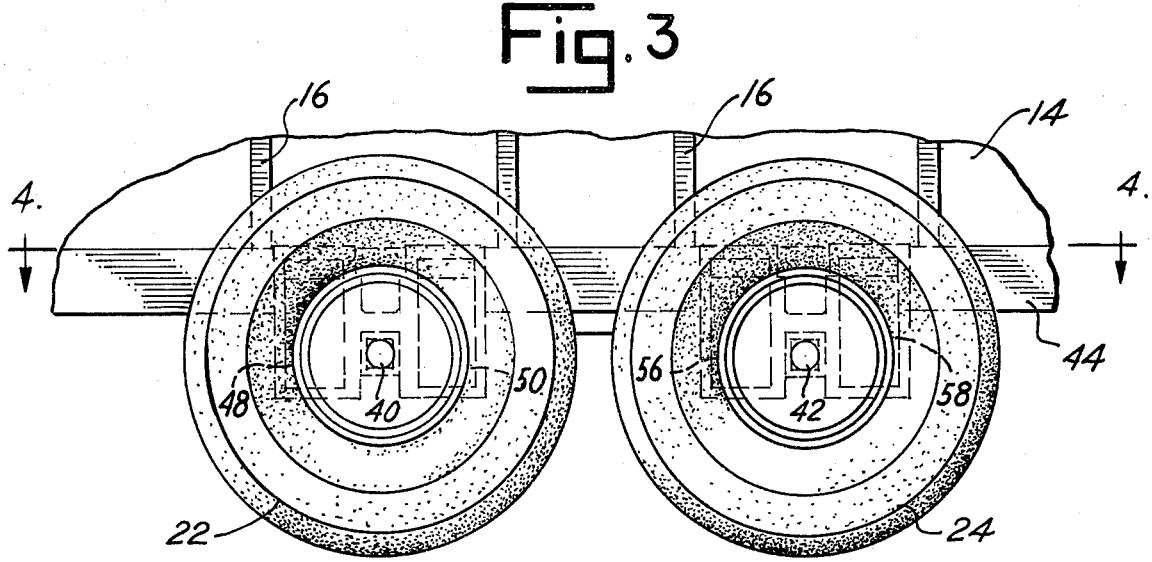
FIG. 3 is a side elevational view of the undercarriage and a portion of the frame of the farm wagon.
Figure 4:
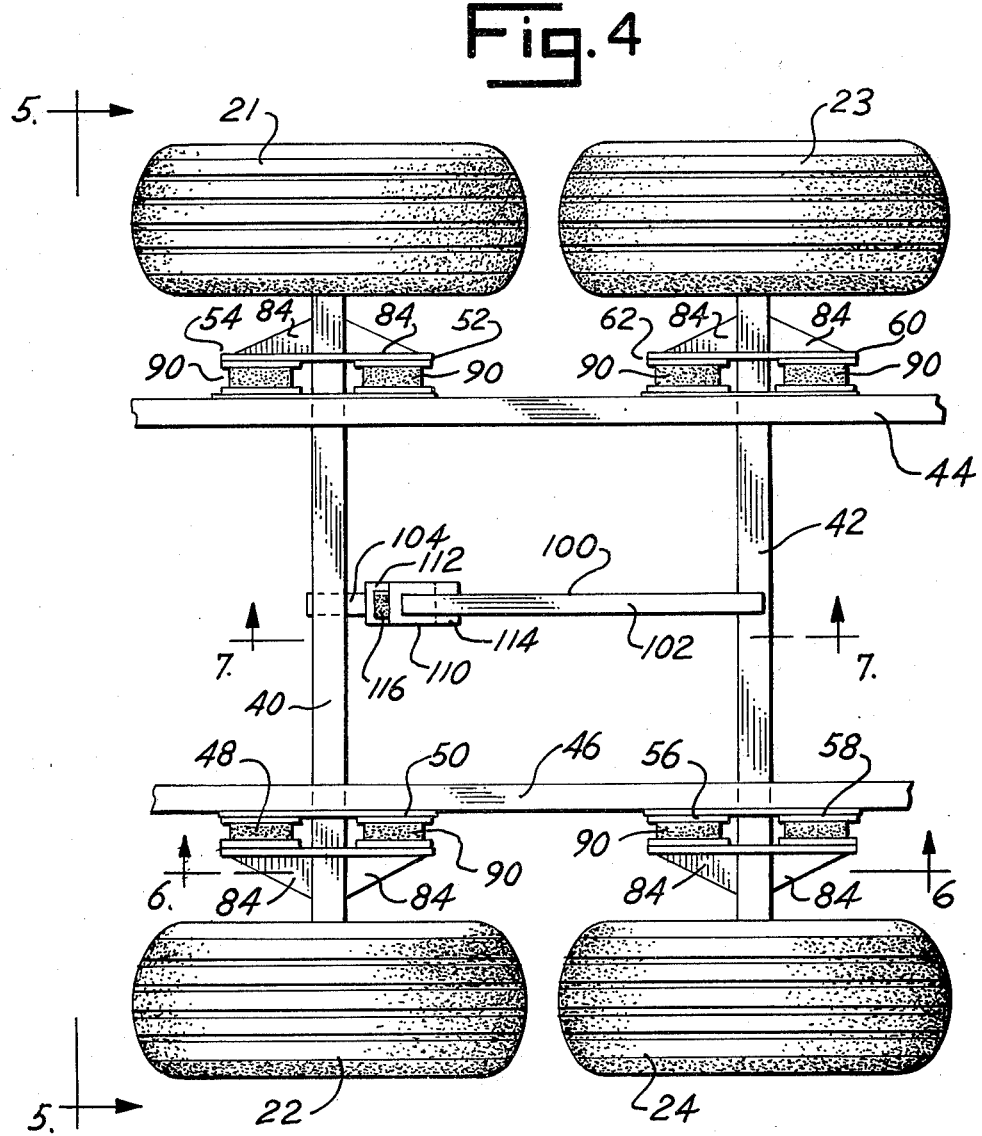
FIG. 4 is a top plan view of the undercarriage embodying the present invention.
Figure 5:
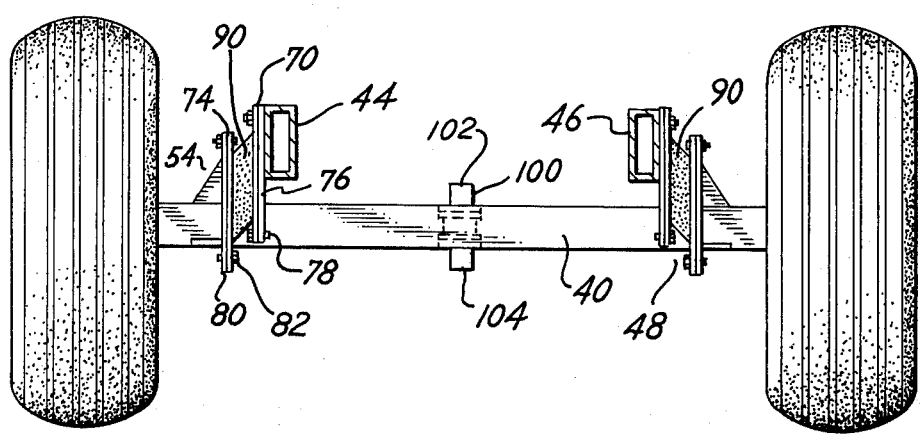
FIG. 5 is an elevational view of the undercarriage and a cross sectional view of the frame, the section being taken on line 5 — 5 of FIG. 4.
Figure 6:
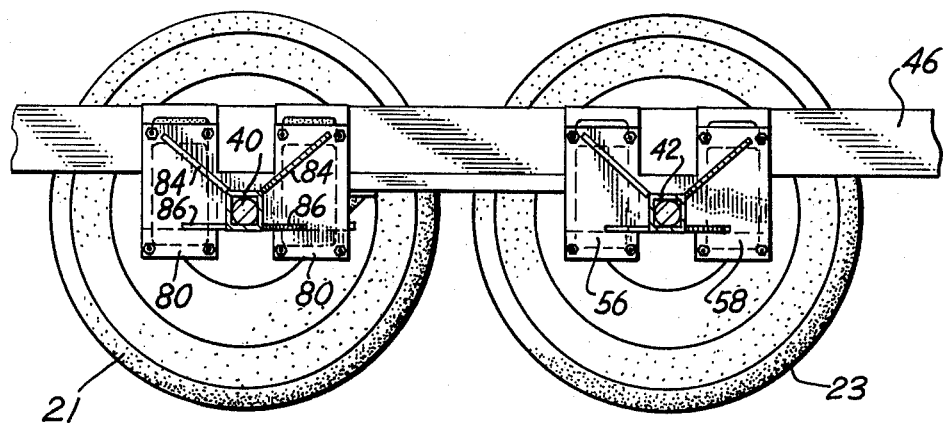
FIG. 6 is a longitudinal cross sectional view of the present undercarriage, the section being taken on line 6 — 6 of FIG. 4.
Figure 7:
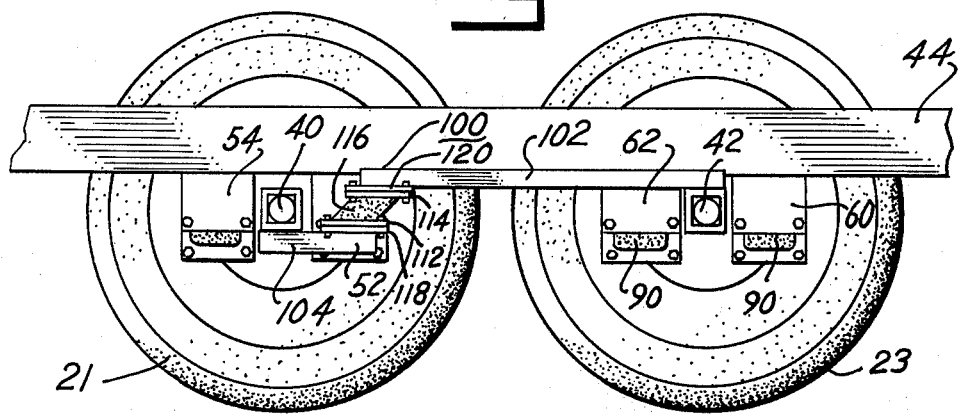
FIG. 7 is another longitudinal cross sectional view of the present undercarriage, the section being taken on line 7 — 7 of FIG. 4.

Referring more specifically to the drawings and to FIGS. 1 and 2 in particular, numeral 10 designates generally the present farm wagon having a main frame 12, a gravity bed 14 mounted on the main frame and supported in an upright position thereon by a series of upright members 16 and 18 disposed around the periphery of the frame and the lower part of the bed. Numeral 20 indicates generally a tandem axle undercarriage embodying the present invention secured to the main frame 12 and having forward wheels 21 and 22 and rear wheels 23 and 24. A frame extension consisting of members 25 and 26 projects forwardly from the main frame and supports tongue or draw bar 27 having one part of a hitch 28 mounted on the front end thereof. The farm wagon shown in the drawings is also provided with a conveyor mechanism indicated generally by the numeral 30 and having a horizontal auger 32 and a vertical auger 34, a shaft for driving the two augers from the tractor being shown at numeral 36. The grain from the bed is elevated through the two auger sections 34' and 34'' for discharging into a bin, grain dryer or other storage facility. The conveyor mechanism does not form any part of the present invention; however, it is disclosed and claimed in our co-pending application Ser. No, 549,665 filed Feb. 13, 1975, now abandoned. While the drawings disclose a farm wagon, the undercarriage embodying the present invention may be used on other types of vehicles, particularly those used in farm operations such as conventional farm wagons, gravity beds and the like.

FIGS. 2 through 5 illustrate the construction of the undercarriage embodying the present invention, the one shown consisting of a tandem axle type having a front axle 40 and a rear axle 42, the forward axle being connected to longitudinal frame members 44 and 46 at each end by a pair of mounting units 48 and 50 on the left hand side of the frame and mounting units 52 and 54 on the right hand side of the frame, and the rear axle being connected at each end by a pair of mounting units 56 and 58 on the left hand side of the axle and a pair of mounting units 60 and 62 on the right hand side of the axle. The longitudinal members of the frame may be either tubular or channel iron construction and are joined together by transverse members 64 and 66 at the front and rear respectively to form a rigid main frame.

The units at each end of the axles are essentially the same and are attached to and are the principal, if not the only, support for the main frame on the axles. Each unit consists of a frame plate 70 and axle plate 74, the frame plate being attached to a support plate 76 by a plurality of bolts 78, and plate 74 being connected to a support plate 80 by a plurality of bolts 82. Plate 76 is welded or otherwise rigidly and permanently secured to the respective longitudinal frame member, and support plate 80 is rigidly connected to the respective axle by rigid brackets 84 and 86, the directional position of the brackets being the only difference between the two units, for example units 48 and 50, supporting one end of the axle. The brackets are welded or otherwise rigidly secured to the outer side of the plate 80 of each unit.

Disposed between and bonded to plates 70 and 74 is an elastomeric member 90 on each unit, the member preferably being substantially all natural rubber of a rather firm durometer so that it will support a substantial weight on the axle. While it will be distorted somewhat by the weight, it generally maintains its parallelogram shape, though the shape is modified in accordance with the weight in the bed and pressure exerted on each end of the axle and in accordance with variations in the terrain over which the wheels pass. The bond between the elastomeric member and the two plates 70 and 74 is sufficiently strong that the member will remain firmly attached to the plates regardless of the load placed in the bed and regardless of the distortion of the member resulting from the load and the distribution of the load on the various wheels resulting from the terrain.

The two plates 70 and 74 and member 90 form an integral unit which is installed by bolting plate 70 to rigid plate 76 on the frame and bolting plate 74 to rigid plate 80 on the axle. Thus the unit supports the frame members 44 and 46 in a position spaced above the axle, the frame members remaining in spaced relation to the axle, but at different elevations therefrom as the load in the bed is varied and as the vehicle traverses uneven terrain. One or both of the axles may be provided with brakes controlled from the tractor and, in order to prevent the axle from rotating when the brakes are applied, a torque arm device 100 interconnects the two axles, the device consisting of an arm 102 connected to axle 42, an arm 104 connected to axle 40, and a resilient unit 106 connecting the two arms. Unit 106 is of a construction similar to units 48 and 50, for example, and consists of a lower plate 112 connected to torque arm 104, an upper plate 144 connected to torque arm 102, and an elastomeric member 116 interposed between the two plates and bonded thereto. Support plates 118 and 120 to which plates 112 and 114, respectively, are secured by a plurality of bolts or other suitable securing means, may be rigidly and permanently attached to arms 104 and 102.

In the use of the farm wagon having the undercarriage embodying the present invention installed thereon, the operation of the wagon is essentially the same as with a normal farm wagon; however, the present undercarriage improves the performance, reduces costs and increases efficiency. As the conventional farm wagon is towed over uneven ground, the front wheels tend to dig into the ground as the wagon passes over soft ground, thus substantially increasing the power required to pull the wagon, since this places a drag on the front wheels. However, the farm wagon with the present undercarriage distributes the load over the four wheels notwithstanding the nature of the ground, thus minimizing the tendency of the front wheels to dig into the ground as occurs with the wheels of the conventional undercarriage and further minimizing the tendency of all four wheels to mire into the ground. Further, the elastomeric material in each unit permits the wheels to adjust to uneven ground, at each end of the axles and between the two axles themselves, thus further giving maximum distribution of the load over the four wheels instead of concentrating the load on two or three of the wheels. Since the flexibility and resilience of members 90 not only are effective on vertical movements of the axles but also on horizontal movements toward the front and rear, this causes the wheels to assist in steering the wagon and to follow closely the tracks of the towing vehicle, such as a tractor. While members 90 primarily operate as load distribution and support members on the tandem axles, they also function to cushion the load on the axle and to minimize the jarring of the wheels on the frame and bed of the vehicle. The torque arm device 100 is primarily used in conjunction with undercarriages having brakes. However, it also assists in stabilizing the axles without substantially restricting the load distribution between the four wheels obtained by the elastomeric members of the various units at the ends of the axles.

The present undercarriage structure has been shown and described when used in conjunction with tandem axles and the maximum advantages thereof are primarily obtained in undercarriages of the tandem axle type; however, the present concept can be used advantageously to support a vehicle frame and bed on single rear axles and can be used on other types of vehicles besides farm wagons. Further, in some installations, it is possible to use one unit at each end instead of two; the single unit may consist of single axle and frame plate with one or more elastomeric members disposed on either side or above or below the respective axle. Various changes and modifications may be made in the present undercarriage and yieldable units such as 48 and 50 without departing from the scope of the invention.

We claim:

1. An undercarriage for farm vehicles having a frame: comprising an axle extending transversely beneath the frame, wheels on each end of said axle, a support assembly near each end of said axle forming the principal support for the frame of the vehicle and connected to said axle and to a frame member of the vehicle, each assembly including forward and rearward vertical plates disposed at right angles with respect to the axle and secured to the forward and rearward sides of said axle, a vertical plate secured to the frame member and spaced inwardly and upwardly from said forward plate, a vertical plate secured to the frame member and spaced inwardly and upwardly from said rearward plate on said axle, said plates all being on planes substantially parallel to one another, and an elastomeric member disposed between said forward axle plate and respective frame plate and an elastomeric member disposed between said rearward axle plate and respective frame plate, and said elastomeric members being firmly bonded to said plates for reaction to shear forces between the respective vertical axle and frame plates.

2. An undercarriage for farm vehicles as defined in claim 1 in which two axles are arranged in tandem parallel to one another and each of said axles is connected to the frame by said support assembly at each end of the respective axle.

3. An undercarriage for farm vehicles as defined in claim 1 in which each assembly has brackets for attaching said axle plates to the respective axle and means for connecting said frame plates to the frame.

4. An undercarriage for farm vehicles as defined in claim 2 in which each assembly has brackets for attaching said axle plates to the respective axle and means for connecting said frame plates to the frame.

5. An undercarriage for farm vehicles as defined in claim 1 in which said elastomeric members have a vertical cross sectional shape of a parallelogram with the lower of the two vertical faces of the member being bonded to the axle plates and the upper of said vertical faces being bonded to the frame plates.

6. An undercarriage for farm vehicles as defined in claim 1 in which the elastomeric material consists principally of natural rubber.

7. An undercarriage for farm vehicles as defined in claim 2 in which a torsion bar means interconnects the two axles and consists of a bar rigidly connected to one of said axles, the second bar rigidly connected to the other of said axles and projecting toward the first bar, and a resilient means interconnecting the two bars.

* * * * *